United States Patent
Barry (10) Patent No.: US 8,746,153 B2
(45) Date of Patent: Jun. 10, 2014

(54) GO-BETWEEN CONTAINER TRANSFER AND SYSTEM

(76) Inventor: Leonard D. Barry, Detroit, MI (US)

(*) Notice: Subject to any disclaimer, the term of this patent is extended or adjusted under 35 U.S.C. 154(b) by 92 days.

(21) Appl. No.: 13/217,984

(22) Filed: Aug. 25, 2011

(65) Prior Publication Data
US 2012/0087768 A1   Apr. 12, 2012

Related U.S. Application Data (63) Continuation-in-part of application No. 11/733,789, filed on Apr. 11, 2007, now abandoned, which is a continuation-in-part of application No. 11/536,298, filed on Sep. 28, 2006, now Pat. No. 7,779,761.

(60) Provisional application No. 60/721,300, filed on Sep. 28, 2005.

(51) Int. Cl.
  B61K 1/00    (2006.01)
  B60P 3/07    (2006.01)
  B61D 47/00   (2006.01)

(52) U.S. Cl.
  USPC .............................. 105/355; 104/20; 414/339

(58) Field of Classification Search
  USPC ........ 104/48, 49, 50, 18, 20, 29, 30; 414/334, 414/332; 238/3
  See application file for complete search history.

(56) References Cited

U.S. PATENT DOCUMENTS

| | | | | |
|---|---|---|---|---|
| 27,978 A * | 4/1860 | Fox | .................................. | 238/3 |
| 1,139,411 A | 5/1915 | Gunn | | |
| 3,047,904 A * | 8/1962 | MacDouald | ...................... | 16/48 |
| 3,077,354 A * | 2/1963 | Rateau | ............................ | 280/99 |
| 3,269,744 A | 8/1966 | Dobson | | |
| 3,596,730 A | 8/1971 | Cecce | | |
| 4,130,208 A | 12/1978 | Barry | | |
| 4,257,619 A | 3/1981 | Fisher | | |

(Continued)

FOREIGN PATENT DOCUMENTS

JP   5227107 A   3/1977

OTHER PUBLICATIONS

Defying the Laws of Fulfillment the KIVA Mobile Fulfillment System; KIVA Systems; 2007.

*Primary Examiner* — Mark Le
(74) *Attorney, Agent, or Firm* — Gifford, Krass, Sprinkle, Anderson & Citkowski, P.C.

(57) ABSTRACT

This loader is for transferring cargo containers between vehicles having an exposed center sill and end platforms to receive the loader between them. The loader has top and bottom frames for respectively extending over and under the center sill of the vehicle. The bottom frame is supported on wheels that fit under the sill. The top frame extends over the vehicle's sill and over the bottom frame of the loader and fits between platforms on the vehicle which supports the ends of the container to align. Air-lift bags on the top frame lift the container off or set it in place on the vehicle. The top and bottom frames are connected along one side to support the loader on its wheels to straddle the sill of the vehicle. The wheels are lifted to carry the loader on the vehicle for transport under the container.

15 Claims, 6 Drawing Sheets

(56) References Cited

U.S. PATENT DOCUMENTS

| | | |
|---|---|---|
| 4,500,248 A | 2/1985 | Kramer |
| 4,599,030 A | 7/1986 | Skaalen et al. |
| 4,921,075 A * | 5/1990 | Schumacher et al. ........ 187/229 |
| 4,950,126 A | 8/1990 | Fabiano et al. |
| 5,121,900 A * | 6/1992 | McDonald .................... 254/2 R |
| 5,174,415 A | 12/1992 | Neagle et al. |
| 5,506,012 A | 4/1996 | Wright et al. |
| 6,695,289 B1 * | 2/2004 | Mickael ....................... 254/122 |
| 7,077,065 B2 | 7/2006 | Tremblay et al. |

* cited by examiner

FIG. 36

GO-BETWEEN CONTAINER TRANSFER AND SYSTEM

CROSS-REFERENCE TO RELATED APPLICATIONS

This invention is a continuation-in-part of my pending U.S. application Ser. No. 11/733,789 filed Apr. 11, 2007, which is a continuation-in-part of U.S. application Ser. No. 11/536,298 filed Sep. 28, 2006, now U.S. Pat. No. 7,779,761, which claims priority of U.S. Provisional Patent Application Ser. No. 60/721,300 filed Sep. 28, 2005.

FIELD OF THE INVENTION

This is a simplified version of my above referenced Underway Vehicle Transfer U.S. Pat. No. 7,779,761 but with a loader for transferring of cargo containers between standing railway cars, trucks, docks and conveyors. The wheels 24 (see FIGS. 35-37) of that, application are not mounted to be turned 90° from parallel to the vehicle to steer straight sideways into a standing railway car. Therefore this invention is directed to overcome that shortcoming. That the loader can transfer containers to and from standing railway cars and trucks is most needed and useful.

SUMMARY OF THE INVENTION

The main object of this invention is to disperse the concentration of container handling from hub centers to shippers' and consignees' locations, greatly reducing wasting fuel and highway congestion by shipments going by rail directly to destinations, eliminating much wasted intermodal transfer and hauls to and from intermodal yards remote from destinations.

It is an object to provide an underreaching lift loader to roll sideways under a standing railway car or highway truck to align with and transfer cargo containers or pallets between the railway car, trucks, docks or conveyors.

It is therefore an object to provide a fork-type or platform lift vehicle that extends rollers or wheels under a railway car sill and a fork or platform over the sill to lift from or set down a cargo container or platform on the railway car and that can lift its wheels and is sized to travel on a semi trailer or railway car.

It is an object to provide the transfer loader with rotary ring casters with an outer horizontal ring with diametrical axle on which wheels on both sides of center rotate separately, those on one side of center being driven so the casters can be easily pivoted to steer. It is an object to turn and hold the swivel casters to steer all wheels in parallel or selectively those at one or either end held parallel to the vehicle while those at the opposite end are steerable. It is an object to provide parallel all wheel caster steering and with wheel axle axis intercepting the vertical swivel axis to steer in one position of the vehicle. It is an object to provide a low cost loader for existing containers.

It is an object to provide a loader that can be hauled on the railway car underneath the container to enable customers without a loader to borrow the loader from the railroad when receiving a container or needing a loader to load the container onto a railway car and return the loader to the railroad locally, i.e. without shipping the loader long distances.

It is an object to provide stations locally to add the loader under a container or space therefore on a railway car to carry it to a customer to use it for transferring one or more containers at the customer's location.

It is an object to provide a loader to transfer existing cargo ISO containers as is (without modification).

It is a further object to provide the loader as a robot or to be remotely controlled.

It is an object to provide that loader operable on roads.

It is also an object to provide the loader as a toy, radio operated.

BRIEF DESCRIPTION OF THE DRAWINGS

These, other and further objects should become evident to those skilled in the art by study of this specification taken with reference to the drawings wherein.

DETAILED DESCRIPTION OF THE INVENTION

Referring to the drawings and in particular to FIGS. 1-9, track 14 imbedded flush in drive area 16 has railway container cars 18 (spline cars) stopped thereon for transfer of cargo pallets or containers 20 to and from cars 18, truck 22, and dock 23 by means of transfer loaders 24. Various lengths and widths of containers or pallets can be accommodated on cars 18, trucks 22, loaders 24 and on the dock 23 as indicated by phantom lines.

Spline cars 18 each have an exposed center sill 26 connecting platform beds 28 for supporting ends of containers 20 at a height above sill 26 for a platform or forks 30 of the transfer loader 24 to reach between sill 26 and the bottom of a container whose ends are supported on holding devices 32, corner castings, on beds 28 of the car. Outer sides 34 of forks 30 guide (slip fit) between the inner facing faces of platform beds 28 to align a container on its berth on the car with the loader within the car's width limits. Ledges 37 with pins on facing sides of beds 28 support platform 30 and secure it in place from slipping when set thereon.

The transfer loader 24 has a lower frame 38 supported on rollers or wheels 40 to roll on drive area 16 over track 14 and under car sill 26. Two wide diamond jacks 42, one on each end of the loader 24, are connected between the lower frame 38 and the top fork platform 30. The jacks are connected to operate in unison by the screw shaft 43 driven by gear motor 44 to lift and lower platform 30 relative to frame 38 to lift or lower a container on the car and to lift wheels 40 to clear above the track for transport on the car to use by customers to transfer the containers. End rollers 45 on platform 30 or on beds 28 help guide the loader between beds 28. Air bags 46 on top of platforms 30 lift, hold, and lower the container in register for transfer.

Figure 6:
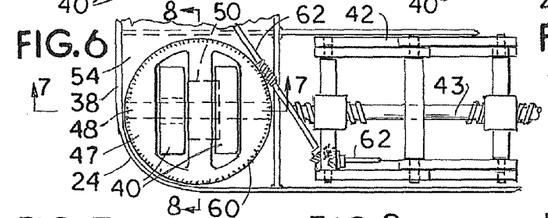
FIG. 6 is a plan view of the near side left corner of FIG. 2 to larger scale.
Figure 7:
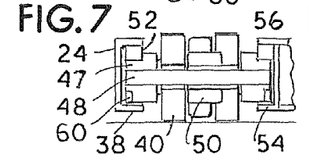
FIGS. 7 and 8 are respectively elevations taken on lines 7-7 and 8-8 of FIG. 6.
Figure 8:
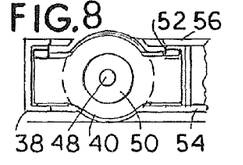

The loader's wheels 40 can be mounted in caster rings 47, one supporting each corner of frame 38 to keep down the height of frame 38 to extend under the railway car 18 and be within the height (diameter) of the wheel 40. One or more wheels 40 are mounted to turn separately on each side of center on axle 48 run diametrically across ring 47 of each caster. An electric gearmotor 50 is connected to drive a wheel or wheels 40 on one side of the axle 48 and is supported by the ring so the caster can be powered and easily steered by turning the ring on its center axis. Each ring 47 is supported to turn on its axis in frame 38 between thrust bearings 52 between two horizontal plates 54 and 56 in aligned circular holes in which the caster ring 47 swivels. Rings 47 each have an integral ring gear 60 on its circumference connected by gearing and shafting 62 to steer the casters in parallel. The shafting is in three sections in the run between the rings 47 at opposite ends of the loader. A clutch 66 connects each end of the middle run to each end shaft to connect the shaft ends together for all wheel parallel steering and is disconnected for either end front end steering with remote controls and locking the opposite end steering casters in position with wheels 40 parallel to the vehicle.

Figure 3:
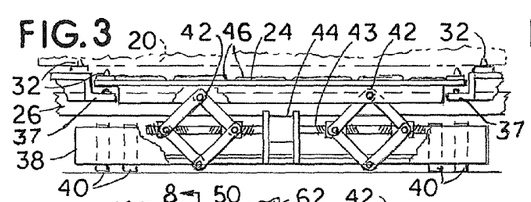
Figure 4:
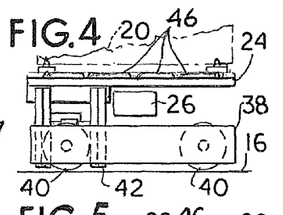
Figure 5:
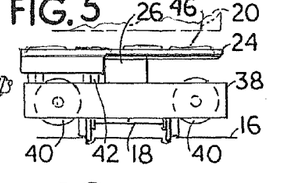
FIG. 5 is an end view of FIG. 3 with the loader lifted on the railway car.

The truck 22 is a tractor trailer with an open center sill 26 and end platforms 28 with locators 32, FIG. 3, for the ends of containers 20 and ledges 37 similar as on the railway car 18 and at the same height for transfer of the container.

Figure 9:
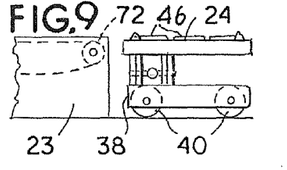
FIG. 9 is an end elevation of the loader at a dock.

The dock 23 has one or more recesses 70 sized for the carrier to enter to set a container across the facing sides of the recess. The dock end platforms have infloor conveyor runs 72 to carry the container to and from over the recesses and into a warehouse or factory.

Operation

The loader can be run under a container on car 18 the jacks 42 being positioned to clear platform 28 over sill 26 and ledges 37 below the container. When the loader is fully inserted, jacks 42 are lowered (retracted) to lift wheels 40 up off driveway 16 to clear track 14 and clamp the loader on the car by lowering the jacks as far as possible. This can be done at a local railway yard before delivering the container to a customer on rail so when the car is spotted at the customer's location the loader can be used by the customer to unload and reload the car.

After the customer receives the car over a driveway 16 jacks 42 are extended to unlock the loader from the car and lower its wheels 40 to driveway 16 and further extending lifts the container from the car's beds 28 up onto the loader's platform 30 high enough to clear holding devices 32. The loader with container thereon is driven or pulled straight out from the car and steered if necessary. It is moved into a recess 70 in the customer's dock 23 carrying the container over ends of the dock to set it down on the dock 23 or conveyor runs 72, FIGS. 1 and 9.

Figure 1:
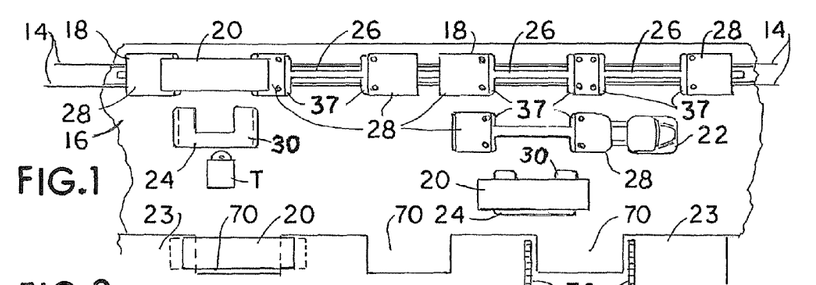
FIG. 1 is a plan view of a transfer driveway with flush imbedded railway track with container cars stopped thereon for transfer of containers between the cars, truck, dock, and conveyor.
Figure 2:
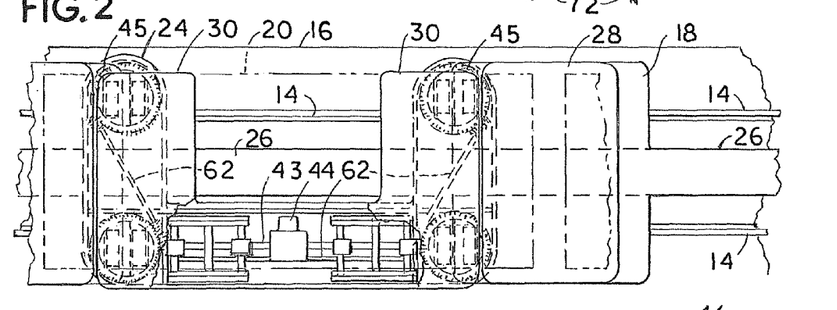
FIGS. 2, 3, and 4 are respectively plan, side and end views of a transfer loader of FIG. 1 with a railway car and containers partly shown to larger scale.

To load the container on the truck the loader with container is moved straight out from car 18 (no steering needed) to leave room for truck 22 to drive parallel between the car and carrier and align with the loader, FIG. 1. The loader is then pushed or driven straight in between end beds 28 on truck 22 and lowered enough to set the container on the truck and clear its sill 26 before pulling the loader out from under the truck.

To load empty or reloaded containers on waiting cars 18 or trucks 22 the loader with a container 20 is moved all the way in to the sill 26 between beds 28 on the vehicle. Next jacks 42 are retracted to set the container on the vehicle's locators 32 and platform 30 on pins on ledges 37. As the jacks are retracted further, wheels 40 are lifted clear from driveway 16. As the jacks are retracted more and tighten, the loader is clamped between the top and bottom of sill 26 and rests on end shelves 37 on the facing sides of beds 28 and keyed or pocketed thereon to hold alignment and provide secure support for the full width of the loader at both ends for travel on the car or truck. The container can be removed from the car or truck or added from above by other means without disturbing the loader below. The loader can be removed from under a container without disturbing the container. The loader preferably is removed from the car locally if owned by the railroad so as to avoid shipping it a long distance along with the container.

Variations

Similar parts are given the same reference number or a suffix added if modified.

Figure 10:
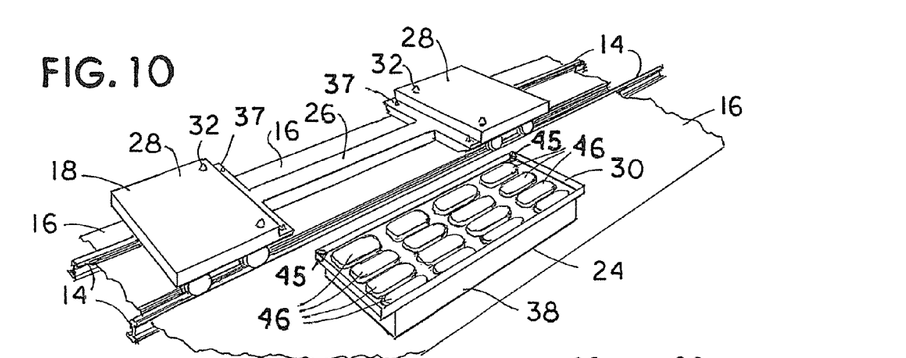
FIG. 10 is a perspective of a loader aligned for transfer with a railway car.
Figure 11:
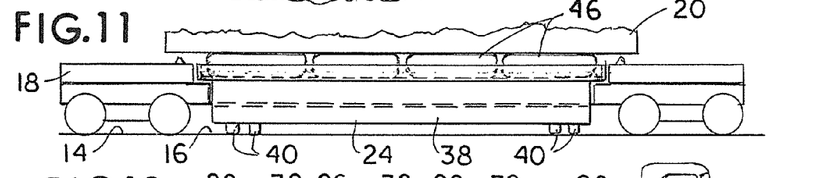
FIG. 11 is a side view of the loader and the car of FIG. 10.
Figure 12:
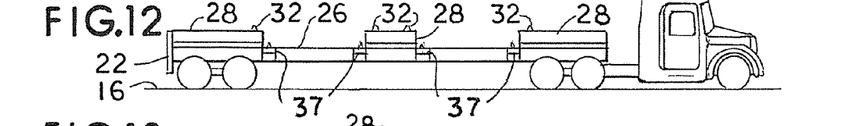
FIG. 12 is a side view of a semi-trailer truck to utilize the loader.
Figure 13:
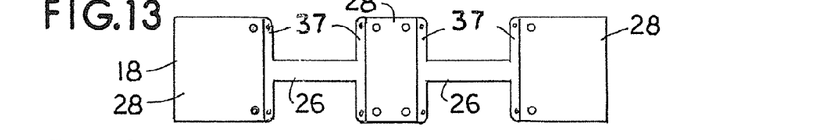
FIGS. 13 and 14 are respectively plan and side views of a railway car to work with the loader.
Figure 14:
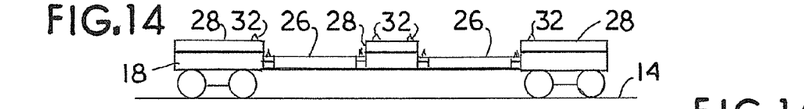
Figure 15:
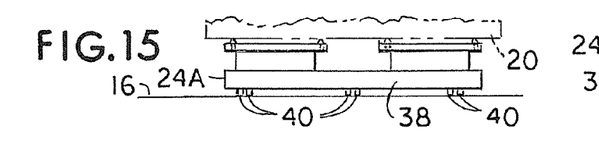
FIGS. 15, 16 and 17 are respectively side, end and bottom views of a double loader for two short or one long container for the car of FIGS. 13 and 14.
Figure 16:
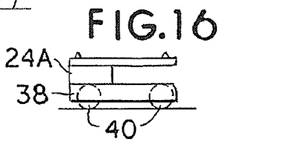
Figure 17:
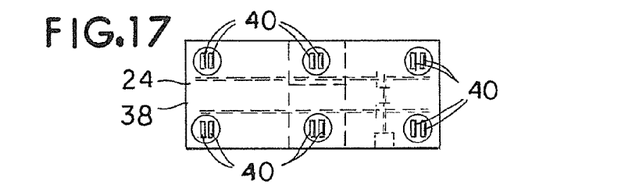
Figure 18:
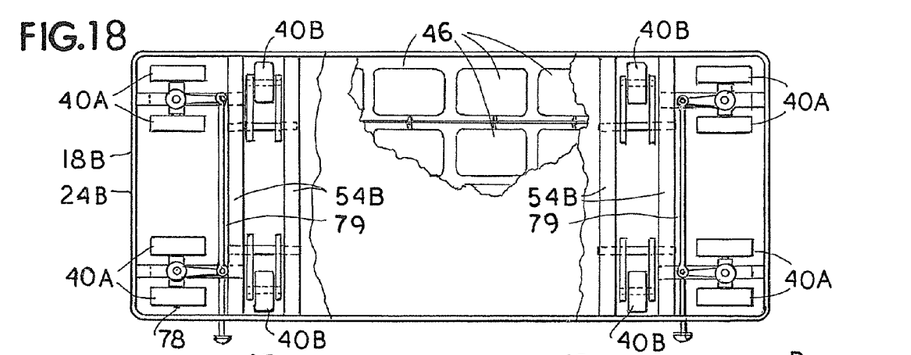
FIG. 18 is a bottom view of a variation of the wheel supports on the loader, FIG. 19 a side view.
Figure 19:
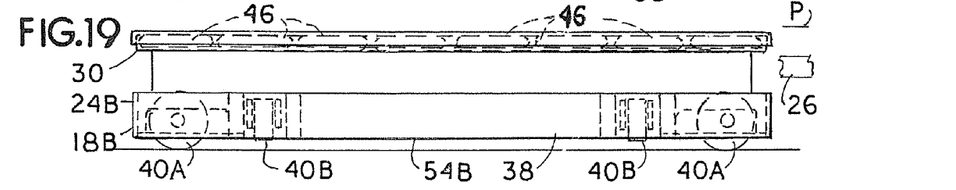

Referring to FIGS. 10-11 the loader can be simplified by eliminating the lift jacks if the wheels can be lifted on frame 38 or transport of the loader on the railroad car is not needed. Air lift bags 46, secured on top of platform 30, are connected to be inflated as one to provide lift sufficient for lifting the container to clear over end beds 28 and locators 32 on car 18 and deflated for setting the container on car 18, trailer 22, dock 23 or conveyor 72. The lower frame 38 and the upper platform 30 can then be one to surround top, bottom and one side of sill 26 between beds 28 between the trucks of the car 18 and the wheels of truck 22. The tops of the air bags engage ribs in the container bottom to hold the container in place on lift platform 30.

The loader need not be motorized (motor 50 omitted) but can be moved about, pushed and pulled by a tractor T, FIG. 1, which can supply auxiliary power or air to steer the loader and lift and lower its jacks and air bags. The loader can be battery operated or by an extension cord and remote controls.

The loader can be built for 20 ft or 40-53 ft existing ISO containers or for larger containers which can go all the way by rail not limited by highway restrictions.

Referring to FIGS. 12-17 car 18 or trailer 22 has an intermediate bed 28 for its three beds 28 to support two 20 ft or one 40-53 ft container. The beds 28 are spaced apart for the loader to enter between adjacent beds 28. The loader 24A has a base frame 38 extending between the trucks of car 18 to engage between a plurality of beds 28 on that car. The lifts 42 or air bags 46 for each berth can be operated separately for the 20 ft containers or simultaneously for the longer loads. The loader can have more ring casters added to its frame 38 as needed to carry the maximum weight expected. All the casters are connected to steer together.

Figures 20, 21, 22, 23, 24, 25:
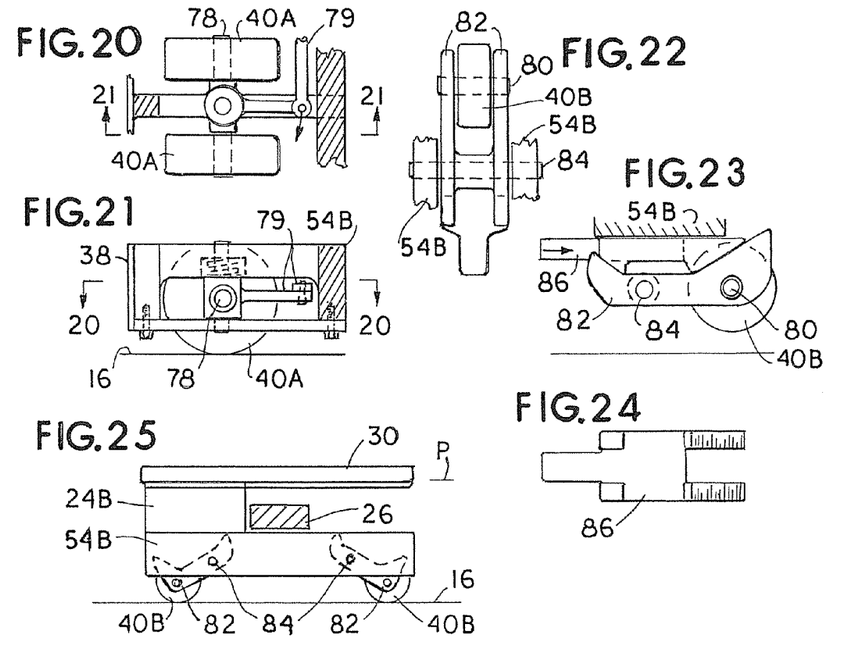
FIGS. 20 and 21 are respectively plan and side views of a wheel assembly of FIG. 18 for lengthwise running at larger scale.
FIGS. 22 and 23 are respectively plan and side elevations of a support wheel mounting of FIG. 18 for sideways movement of the loader at a larger scale.
FIG. 24 is a bottom view of the shift-to-lift wedge of FIG. 23.
FIG. 25 is an end elevation of the loader of FIGS. 18-19 shown lifted on its wheels for sideways movement with relation to sill and dock.
Figure 26:
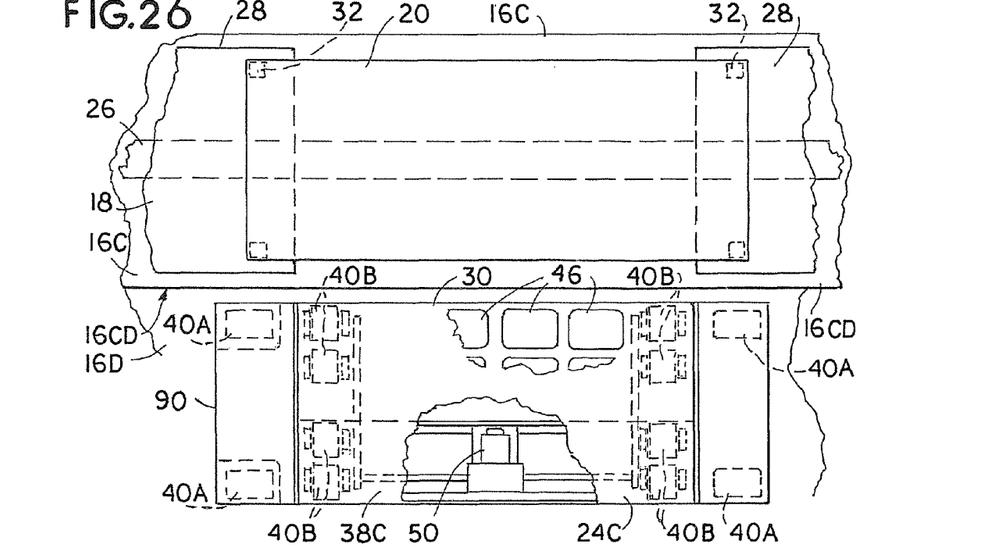
FIG. 26 is a plan view of a variation of the loader on a separate shuttle car aligned for transfer of a container on the railway car or truck.
Figure 27:
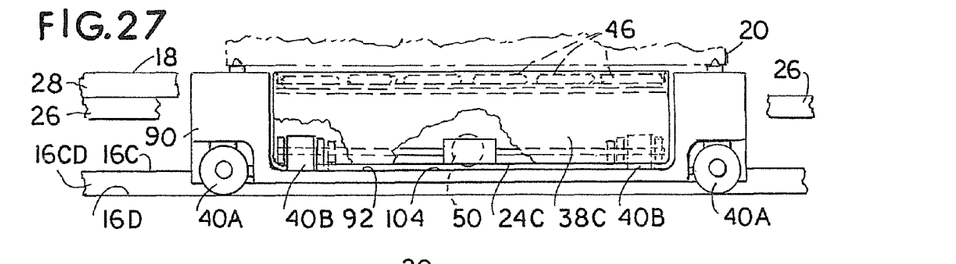
FIG. 27 is a side elevation of the loader on the shuttle car of FIG. 26.
Figure 28:
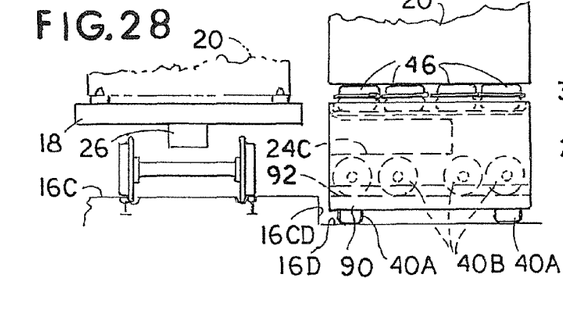
FIGS. 28 and 29 are end elevations of respectively the loader on the shuttle and rolled off of the shuttle and located around the sill of the car for transfer of the container.
Figure 29:
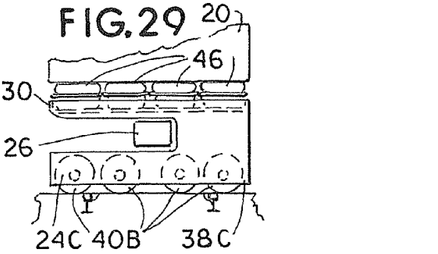

Referring to FIGS. 18-25, loader 18B has wheels 40A mounted spaced apart on the ends of axles 78 and steered by arms and linkage 79 for lengthwise movement of the loader. The loader also has wheels or rollers 40B each mounted on an axle 80 supported between double wedge arms 82 pivot mounted at 84 to frame 54B to lower roller 40B to lift the loader off of wheels 40A to run straight sideways in and out from a vehicle 18, 22, or dock 23. Referring to FIGS. 22-24, a double wedge 86 is mounted in frame 54B to engage both arms 82 to double wedge and to shift straight to the right, FIG. 23, to lower wedge arms 82 for wheels 40B to support the loader and wedge arms 82 to lift when the double wedge slide 86 is shifted back to the left to lift wheels 40B above driveway 16. FIG. 25 shows how much the extension of wheels 40B raises the lift platform 30 relative to the dock or vehicle bed level P high enough to lift load while keeping clear of sill 26. The lift wheels 40B are the sideways running wheels because the liftings and lowerings are made for sideways transfers.

Referring to FIGS. 26-29, loader 24C has the lifting platform 30 mounted on frame 38C to surround top, bottom, and one side of sill 26 of car 18. This loader is supported on several wheels 40B to move sideways. A shuttle car 90 on powered wheels 40A carries the loader lengthwise on driveway 16D along the loading area and steers for road operation. Driveway 16C has a depressed runway 16D for the shuttle car and a paved area flush along track 14 and extending to and along the top edge of wall 16CD extending down to the runway 16D. The shuttle car has a depressed center platform 92 to carry the loader at the height of the upper trackway 16C. Wheels 40B are arranged in line four in a row at each end of the loader 18C to carry the loader over the gap between the shuttle car platform 92 and the paved track elevation 16C. Air bags 46 on platform 30 are inflated and deflated together to lift and lower a container to clear over car 18 or set the container down on the car. Wheels 40A can be steerable, powered, and mounted in a usual manner and can be larger than wheels 40B because they do not need to fit under still 26.

Operation

For FIGS. 26-29

The transfer shuttle 90 with the transfer loader 24C is stopped when aligned with a car 18 with container for transfer. The transfer loader is sent off to straddle the car sill 26 and align with the container above. The air bags are inflated, lifting the container to clear the car, and the transfer loader is returned to the shuttle with the container which it sets on the shuttle when the air bags 46 are deflated, or left inflated for a short ride on the shuttle. The shuttle takes the loader and container to align a dock 23 where the loader with air bags 46 lifted is run off of the shuttle to carry the container over end platforms of dock 23 or across runs of a plate conveyor at the dock. The air bags are deflated to set the container down on the dock and the loader returned to the shuttle for its next job.

Since first filing for this invention clarification and further improvement follow:

Referring to FIGS. 30-36, vehicles 18 and 22 and container 20 are as described. Loader 24N has an air cushion pillow or pillows 46N secured on its platform 30 to extend up to conform to the bottom ribs of substantially any cargo container to hold it in position on platform 30. Loader 24N has platform 30 secured to its lower frame 38N which extends along one side of platform 30 to clear center sill of car 18 or truck 22 and extends under the sill only a short ways to support wheels 40 in lift levers 82N.

Levers 82N are U-shaped with two parallel sides pivoted at 84 to frame 38N to swing vertically transversely on the loader. The two levers 82N at each end of the loader each have on their facing ends a gear quadrant 96 centered on pivot 84 and in mesh through a lift arc to lift and lower arms 82N equally. Wheels 40 are mounted on axle 48 either on ring casters 47N or directly across the sides of lever 82N to lift and lower wheels 40 equally. Levers 82N half surround wheels 40 to support rings 47N and where they extend under sill 26 are below the height (diameter) of wheels 40. Levers 82N at each end of the loader are lifted and lowered by an air or hydraulic cylinder 100 pivotally connected between frame 38 N and lever 82N directly below, where cylinder 100 can extend up above sill 26.

Figure 34:
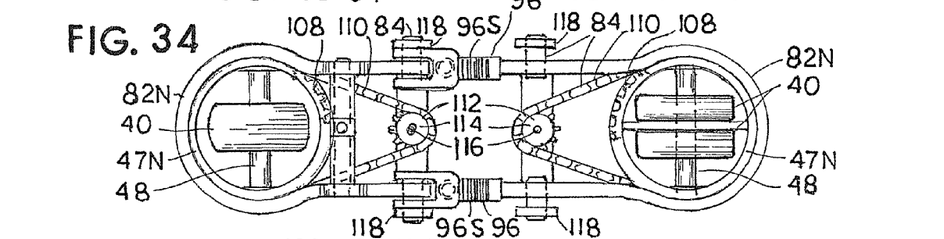
FIGS. 34 and 35 are respectively plan and side views of a portion of a wheel steering and lift assembly on the loader to large scale.
Figure 35:
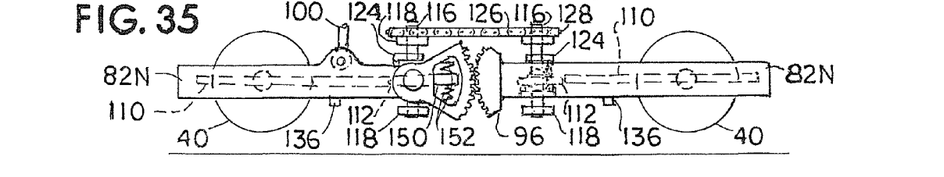
Figure 36:
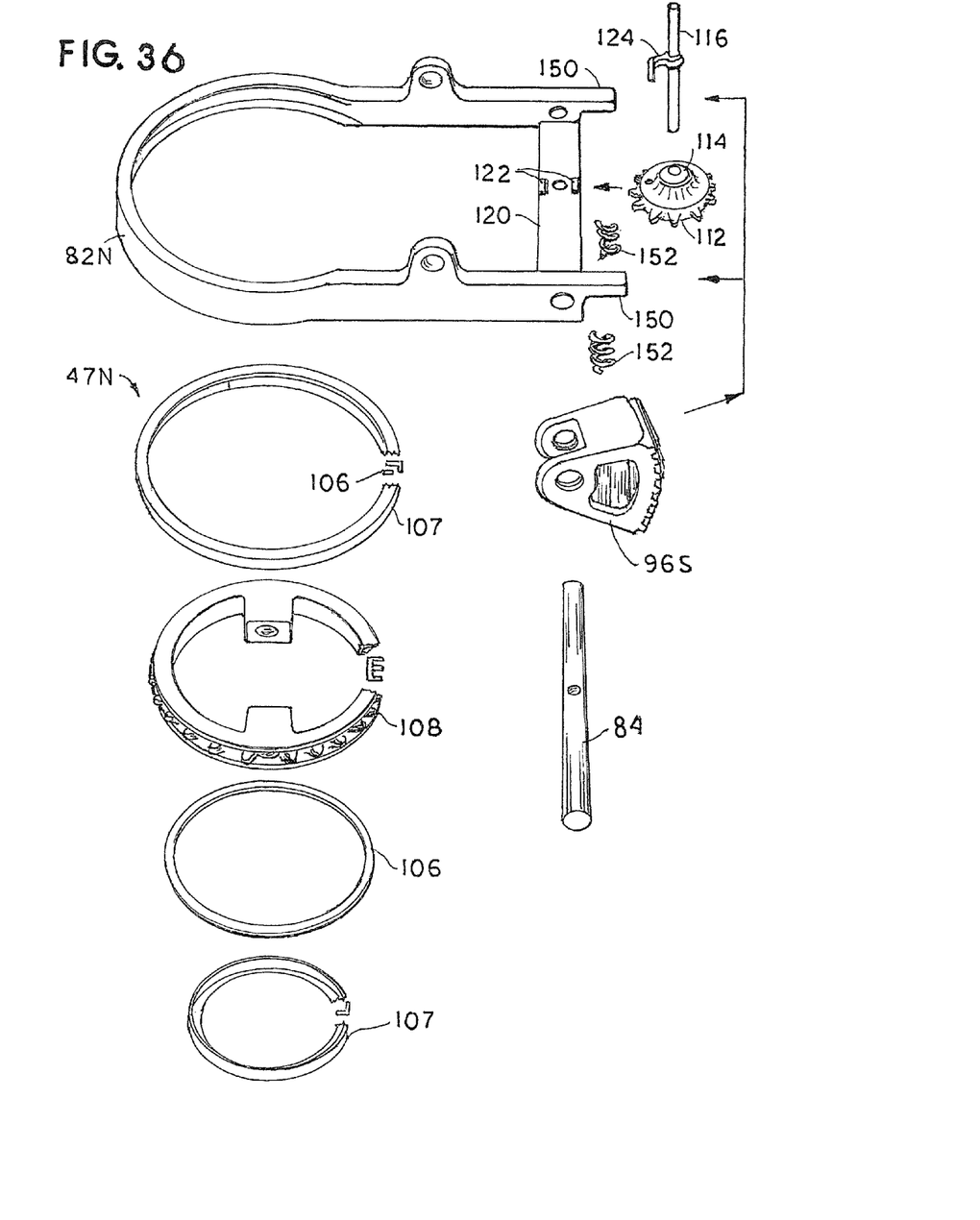
FIG. 36 is an exploded view of the wheel swivel and lift assembly.

Referring to FIGS. 34-36, each lift lever 82N is supported on a ring caster 47N that typically has a thrust bearing ring hole plate 106 that rests on top of a thrust bearing 107 that has tapered rollers or is a low friction plastic insert above and below the swivel ring of coaster 47 for easy steering, and a bottom retainer ring 107 all secured on lever 82N to lift wheels 40. Casters 47N each have sprocket teeth 108 around the ring for roller chain 110 connected around a wobble sprocket 112 to turn the caster with the wobble sprocket.

Wobble sprocket 112 has top and bottom inner flanges pressed against a loose central ball 114 to hold the ball in the sprocket. Ball 114 is secured on a vertical shaft 116 that turns in bearings 118 on frame 38N. The center line of shaft 116 intersects the center line of pivot 84 within lever 82N. A plate 120 is secured across the sides of lever arm 82N supporting rollers 122 under the wobble sprocket to keep it parallel to the lever arm. This keeps chain 110 connected around the wobble sprocket and caster sprocket 47N in one plane as lever arm 82N lifts and lowers wheel 40. A key pin 124 loose through a hole in sprocket 112 is secured to shaft 116 to turn wobble sprocket 112 with shaft 116.

Figure 30:
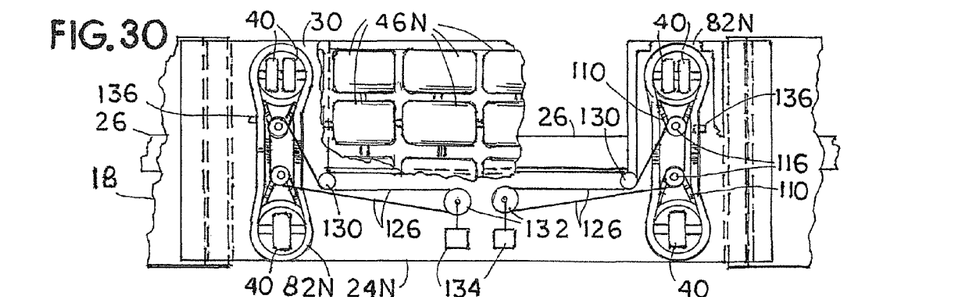
FIG. 30 is a plan view of a variation of the loader with improved steering and lift with a portion of its lift platform removed to show the steering lift and frame and a portion of the spline car and container.

Referring to FIGS. 30 and 35, two shafts 116 at each end of the loader are connected by roller chain 126 and sprockets 128 to turn wheels 40 at that end in parallel. Chain 126 continues around a redirecting sprocket 130 and a sprocket 132 on the shaft of a gearmotor 134 for each end on the loader to steer separately.

A wedge pin 136 for each end lever 82N is extended from a hole in frame 38N under lever 82N to hold each lever lifted to hold its wheel or wheels 40 lifted or pin 136 is extended over lever 82N to hold the lever down to support the loader on its wheels. Pins 136 can be inserted manually or by solenoid or air cylinder.

Air bags 46 can remain inflated all the time and levers 82N do all the lifting. The air bags then are air pillows only serving to hold and cushion the container in place on lift platform 30. This is applicable in all embodiments that lift wheels 40.

Figure 31:
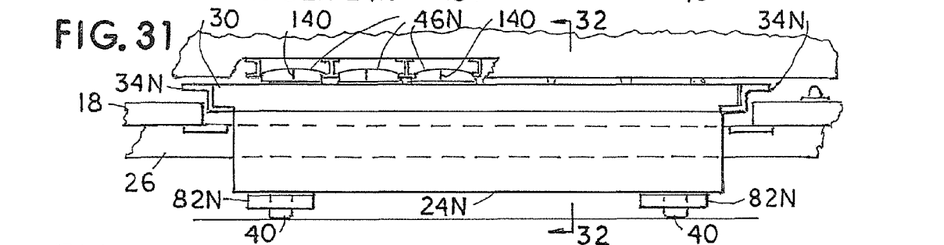
FIG. 31 is a side elevation of FIG. 30 with lower portion the cargo container partly in section.
Figure 32:
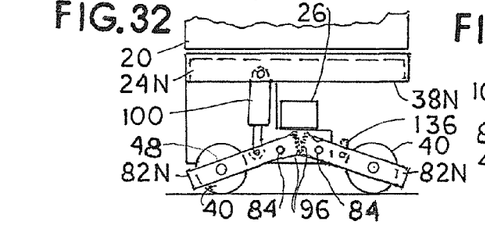
FIG. 32 is an end sectional view taken on line 32-32 of FIG. 31.
Figure 33:
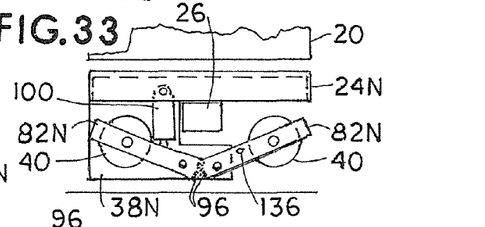
FIG. 33 is FIG. 32 with wheels raised.

There need be only one large air bag on the loader platform 30 if tie ropes 140, FIG. 31 are added to connect the top of the air bag to the bottom to limit how high the bag or pillow extends over its full area.

Wheels 40 that run under sill 26 can be smaller than those on the opposite side of the loader as shown in FIG. 30. The two small wheels could take the load of the larger wheel.

Since the loader may be operated over uneven pavement it is desired to provide spring cushioning between the wheels on opposite transverse sides of the loader. Accordingly FIGS. 34 and 35 show one of meshing gear segments 96S between opposite levers 82N connected loose on pivot 84 with a tongue 150 pocketed between springs 152 in the gear segment helmet 96S.

Platforms 30 of all these loaders 24, 24A, 24B, 24C, and 24N can have top end flanges 34N, FIGS. 30 and 31, that clear over beds 28 which when lowered support the loader on the bed of vehicles 18 or 22 to eliminate need for flanges 37 on the vehicles.

Having thus described a few embodiments of my invention, various parts can be substituted for the parts shown, which is intended to be covered by the claims to include all variations and parts which are within the true spirit and scope of this invention.

I claim as my invention:

1. In combination having a cargo container, a transport vehicle with a transfer loader and a mechanism to move said loader to transfer said cargo container, and a driveway under said vehicle for said loader, wherein said transport vehicle having a frame having an exposed center sill supported on travelable end supports and container support beds spaced apart on and above said center sill with space for carrying said cargo container across said beds, the improvement comprising: said loader having a roadable running support frame with steerable swivel casters on said driveway including wheels that under-reach said sill sized and steerable to move on said driveway both lengthwise to position align and then transversely to enter under said center sill to support the loader from tipping and a lift platform sized to fit and align with and between said container support beds and the lift platform extending out over the center sill of said vehicle to support said cargo container within loading width limits for said vehicle, said casters being connected to swivel and steer in parallel to guide said wheels to steer in parallel to guide said loader to move on said driveway lengthwise and transversely to said vehicle between said beds to align said container for transfer on said vehicle and store under said container on said vehicle for transport with said container on said vehicle, a mechanism connecting said roadable running support frame and said lift platform aligned vertically along one side of said center sill to straddle said center sill, a lift mechanism to retract said wheels above said driveway for transport of said loader on said vehicle and extend to lift said lift platform for movement over said center sill and clear under said container and to lift further to support said container on said lift platform aligned for transfer to and from said vehicle, and supports for carrying said loader stored on said vehicle with said loader aligned between said container support beds and beneath space occupied by said cargo container on said vehicle, locating mechanism to hold said loader from moving sideways for transport on said vehicle, and a holding mechanism on said platform to hold said container in position on said platform during transfer on and off of said vehicle, said supports for carrying said loader including a shelf on each facing side of and below the top of said beds and at least high enough to support and guide the ends of said lift platform across the vehicle for travel on the shelves, leaving room for said container above on the vehicle, said mechanism connecting said roadable running support frame and said lift platform connected to said lift mechanism to lift and lower said roadable running support frame to stow said loader under the space for said container on said vehicle for transport therewith.

2. A structure as in claim 1, said casters each having some said wheels and a horizontal swivel ring and a support for said ring surrounding all of said wheels of each said caster, an axle supported substantially across the diameter of said ring, at least one of said wheels being on each side of the center of said ring within said ring on said axle and mounted to revolve separately on each side of the center of said ring, a mechanism to turn each said ring to steer all said casters together each on its swivel axis intersecting its said axle to turn to steer said loader both sideways and lengthwise and enable the diameters of said wheels to be sized to clear closely under said center sill.

3. A structure as in claim 2, said mechanism to steer including a ring gear or sprocket concentric on each said swivel ring, and gearing or chain and shafting connecting each said ring gear to turn said casters together operable to steer said loader.

4. A structure as in claim 1, said lift mechanism when retracted around said center sill clamping to said shelf at each end and the bottom of the sill between said lift platform and said roadable running support frame for transport of said loader underneath space for the cargo container.

5. A structure as in claim 1, a railway track flush in said driveway, said vehicle being a railway car setting on said railway track, said roadable running support frame being moveable on said driveway transversely under said center sill with said lift platform above to clear over said center sill to align transversely central with said vehicle to transfer said cargo container and travel central under said cargo container on said railway car.

6. A structure as in claim 1, said road running support including said wheels that are arranged in a first set of wheels for running and steering lengthwise, and a second set of wheels mounted for rolling the loader straight sideways, said lift mechanism including a lifting device for said second set of wheels to extend/retract these wheels to lift said loader from said first set of wheels to a height to clear said loader for running sideways under center sill of, and any load on, the vehicle to substantially align a load central to a width of both the loader and the vehicle for transversely centrally aligned transfer.

7. A structure as in claim 6, said lifting device having additional lift left to extend said second set of wheels further to lift a load from the vehicle to clear for side transfer on the loader.

8. A structure as in claim 1, said lift platform including inflatable lift bags connected on said lift platform to inflate to lift and deflate to lower said cargo container on said lift platform for transfer between said vehicle and said loader and to conform to the bottom of said container to hold it in position on said loader when said cargo container is lifted on said lift bags.

9. A structure as in claim 1, said mechanism connecting said roadable running support frame being said lift mechanism including diamond jacks connected between said lift platform and said roadable running support frame along one side of the loader, and jack screws connected to operate said jacks together to transfer the container to and from the vehicle and to lift said wheels off of said driveway, said jack screws holding said wheels lifted up for transport of said loader on said vehicle.

10. A structure as in claim 1, wherein said vehicle is a semitrailer.

11. A structure as in claim 9, said diamond jacks being retractable to lower enough further to clamp said loader to said vehicle for transport thereon.

12. A structure as in claim 1, said lift platform having one or more air inflatable bags secured on top of said platform and connectable to air pressure to inflate to support the cargo container from bottom and deflate to set the container on either said vehicle, said air inflatable bags when inflated under the container conforming to the shape of the bottom of the container to secure the container in place on the platform.

13. In a combination as in claim 1, said supports being flanges along the top of the ends of said platform to overlay over facing sides of said beds to set down on said supports to carry said loader on said vehicle.

14. In a combination as in claim 1, said holding mechanism being at least one air pillow including air bags connected together for connection to a source of air.

15. In a combination as in claim 14, said air bags all connected together for connection to the source of air to inflate to lift said container up from said vehicle to hold and clear to transfer from and to said vehicle.

* * * * *